(12) United States Patent
Giemza

(10) Patent No.: US 10,883,569 B2
(45) Date of Patent: Jan. 5, 2021

(54) SECURING DEVICE

(71) Applicant: Gripple Limited, Sheffield (GB)

(72) Inventor: Lee Giemza, Wakefield (GB)

(73) Assignee: GRIPPLE LIMITED

( * ) Notice: Subject to any disclaimer, the term of this patent is extended or adjusted under 35 U.S.C. 154(b) by 0 days.

(21) Appl. No.: 16/463,757

(22) PCT Filed: Jan. 15, 2018

(86) PCT No.: PCT/GB2018/000008
§ 371 (c)(1),
(2) Date: May 23, 2019

(87) PCT Pub. No.: WO2018/130809
PCT Pub. Date: Jul. 19, 2018

(65) Prior Publication Data
US 2019/0383355 A1      Dec. 19, 2019

(30) Foreign Application Priority Data

Jan. 16, 2017   (GB) .................................. 1700691.7
Nov. 16, 2017  (GB) .................................. 1718938.2
Jan. 12, 2018   (GB) .................................. 1800555.3

(51) Int. Cl.
*F16G 11/04*    (2006.01)
*F16G 11/10*    (2006.01)

(52) U.S. Cl.
CPC .......... *F16G 11/048* (2013.01); *F16G 11/106* (2013.01)

(58) Field of Classification Search
CPC ..... F16G 11/048; F16G 11/101; F16G 11/106
See application file for complete search history.

(56) References Cited

U.S. PATENT DOCUMENTS

| | | |
|---|---|---|
| 3,078,112 A | 2/1963 | Mathey |
| 3,335,469 A | 8/1967 | Shand et al. |
| 4,252,992 A | 2/1981 | Cherry et al. |
| 4,295,749 A | 10/1981 | McBride |
| 5,369,849 A | 12/1994 | De France |

(Continued)

FOREIGN PATENT DOCUMENTS

| | | |
|---|---|---|
| DE | 19507815 A1 | 10/1996 |
| DE | 102006021555 A1 | 11/2007 |

(Continued)

*Primary Examiner* — Robert Sandy
*Assistant Examiner* — David M Upchurch
(74) *Attorney, Agent, or Firm* — Clark Hill PLC; James R. Foley

(57) ABSTRACT

A securing arrangement (10) comprises an elongate article (14) and a securing device (12). The securing device (12) has a body (20) and first and second clamping members (28) within the body (20) for clamping the elongate article (14). The clamping members (28) are disposed in an opposed position relative to one another. The elongate article (14) comprises a plurality of strands (16A-16F) wound around one another in a plurality of turns of each strand. Each strand (16A-16F) has substantially the same pitch as each other strand, and each clamping member (28) has an engaging surface (57) for engaging the elongate article (14). Each engaging surface (57) is configured to engage half or more of the total number of strands forming the elongate article (14).

22 Claims, 14 Drawing Sheets

(56) References Cited

U.S. PATENT DOCUMENTS 5,683,273 A * 11/1997 Garver ................. H01R 4/5025
174/84 R
7,726,082 B2 * 6/2010 Hayes .................... E04C 5/127
52/223.13

FOREIGN PATENT DOCUMENTS

| DE | 102009015288 A1 | 11/2010 |
| EP | 2649902 A2 | 10/2013 |
| WO | 99/67549 A1 | 12/1999 |
| WO | 2010/019638 A3 | 2/2010 |

* cited by examiner

SECURING DEVICE

This invention relates to securing devices for securing an elongate article. More particularly, but not exclusively, this invention relates to securing devices for clamping cables, wire ropes, wires or the like. Embodiments of the invention relate to clamping devices. This invention also relates to securing arrangements comprising securing devices and elongate articles.

It is known to secure an elongate cable by means of a clamping wedge in a securing device. The cable is clamped by the wedge between two tapering walls. The load capacity of such clamping devices can be limited and, when the full load has been applied to the cable, it can be difficult to release the wedge.

According to a first aspect of this invention, there is provided a securing arrangement comprising an elongate article and a securing device having a body and first and second clamping members within the body for clamping the elongate article, the clamping members being disposed in an opposed position relative to one another, wherein the elongate article comprises a plurality of strands wound around one another in a plurality of turns of each strand, wherein each strand has substantially the same pitch as each other strand, and wherein each clamping member has an engaging surface for engaging the elongate article, each engaging surface being configured to engage half or more of the total number of strands forming the elongate article.

The first and second clamping members may be arranged directly opposite each other.

The securing device may comprise a carriage for carrying the clamping members in said opposed position. The body may have opposed walls tapering inwardly towards each other, said opposed walls defining a passage along which the carriage can move.

The passage may be configured to receive an elongate article therethrough between the clamping members. Movement of the carriage along the passage in the direction of the inward tapering of the opposed walls may cause the walls to urge the clamping members towards each other to clamp the elongate article.

According to a second aspect of this invention, there is provided a securing device comprising first and second elongate clamping members, a carriage for carrying the clamping members, and a body having first and second walls tapering inwardly towards each other, the first and second walls defining a passage along which the carriage can move, said passage being configured to receive an elongate article therethrough between the clamping members, wherein movement of the carriage along the passage in the direction of the inward tapering of the walls causes the clamping members to be urged towards each other to clamp the elongate article.

The first and second walls may be disposed directly opposite each other.

According to a third aspect of this invention, there is provided a securing device comprising first and second clamping members disposed in an opposed position relative to one another, a carriage for carrying the clamping members in said opposed position, and a body having opposed walls tapering inwardly towards each other, the opposed walls defining a passage along which the carriage can move, said passage being configured to receive an elongate article therethrough between the clamping members, wherein movement of the carriage along the passage in the direction of the inward tapering of the walls causes the clamping members to be urged towards each other to clamp the elongate article.

According to a fourth aspect of this invention, there is provided a securing arrangement comprising a securing device and an elongate article, the securing device comprising first and second clamping members disposed in an opposed position relative to one another, a carriage for carrying the clamping members in said opposed position, and a body having opposed walls tapering inwardly towards each other, the opposed walls defining a passage along which the carriage can move, said passage being configured to receive the elongate article therethrough between the clamping members, wherein movement of the carriage along the passage in the direction of the inward tapering of the walls causes the clamping members to be urged towards each other to clamp the elongate article.

In the embodiment described herein, the carriage provides the advantage that it ensures the clamping members are disposed symmetrically about the elongate article, opposite each other, so that the first clamping member is aligned with the second clamping member lengthwise along the elongate article. This ensures that the elongate article is gripped substantially along the length of both clamping members.

Without the carriage, various factors, including the differences in friction between the first and second clamping members and the elongate article, would result in the clamping members being misaligned lengthwise of the elongate article. The misaligned clamping members would have the effect that the elongate article is gripped only where the clamping members overlap each other. The gripping force on the elongate article would thereby be reduced, as would the load that could be borne by securing device.

Thus, the carriage ensures that the clamping members are aligned with each other, so that the maximum force can provided to clamp the elongate article, thereby ensuring that the maximum load can be borne by the securing device.

Each of the first and second clamping members may be elongate. Each of the first and second clamping members may comprise a wedge.

The carriage may be movable between a clamping condition, in which the clamping members can clamp the elongate article, and a release condition, in which the clamping members are released from the elongate article.

When the carriage is in its clamping condition, each clamping member may be in clamping engagement with the elongate article to secure the elongate article to the securing device. When the carriage is in its release condition, each clamping member may be released from the elongate article to allow the elongate article can move in the passage.

The elongate article may comprise a plurality of engageable strands that can be engaged by the clamping members. The engageable strands may be wound around one another in a plurality of turns of each engageable strand.

Each of said engageable strands may have substantially the same pitch as each of the other of said engageable strands. Each clamping member may have an engaging surface for engaging the elongate article.

Each of said engageable strands may be engaged by one or both of the clamping members. Each clamping member may be configured to engage half or more of the total number of said engageable strands In the embodiment described herein, the feature that each clamping member extends over half or more of the total number of said engageable strands in the elongate article provides the advantage that the elongate article is clamped tightly between the clamping members, and the risk of the elongate article being cut by either clamping member is minimised.

When the elongate article is clamped between the clamping members, each of said engageable strands of the elongate article is engaged by one or both of the clamping members. In one embodiment, where the number of said engageable strands is six, each clamping member may engage three or more of said engageable strands.

Each of said engageable strands may be in the form of a helix. The elongate article may be a wire, cable, rope or the like.

Each clamping member may have a main portion. Each engaging surface may be provided on the main portion of the respective clamping member.

Desirably, each clamping member may be configured to engage two thirds or more of the total number of said engageable strands. In one embodiment, where the elongate article has six of said engageable strands, each clamping member may engage four or more of said engageable strands.

Desirably, each clamping member may be configured to engage at least three quarters of the total number of said engageable strands. In one embodiment, where the elongate article has six of said engageable strands, each clamping member may engage five or more of said engageable strands.

More desirably, each clamping member may be configured to engage all of said engageable strands. In one embodiment, where the elongate article has six of said engageable strands, each clamping member may engage all six of said engageable strands.

The engaging surface may have a dimension which may be substantially equal to 50% or more of the pitch of said engageable strands. The engaging surface may be configured to engage the elongate article, such that the aforesaid dimension of the engaging surface extends along the elongate article. The dimension may be the length of the engaging surface.

As used herein, the word "pitch" means the length of one complete turn of a strand measured along the main longitudinal axis of the elongate article.

The aforesaid dimension of the engaging surface is desirably substantially equal to 67% or more of the pitch of said engageable strands. The aforesaid dimension of the engaging surface is desirably substantially equal to 75% or more of the pitch of said engageable strands. The aforesaid dimension of the engaging surface is desirably substantially equal to 100% or more of the pitch of said engageable strands.

The aforesaid engageable strands may constitute outer strands of the elongate article. In addition to the aforesaid engageable strands above, the elongate article may include at least one central strand around which the aforementioned engageable strands are wound.

The central strand may comprise a core strand around which the aforementioned engageable strands are wound, or an inner layer comprising a plurality of inner strands around which the aforementioned engageable strands are wound. The inner strands may be wound around a core strand.

The aforesaid strands may constitute outer strands of the elongate article. In addition to the aforementioned strands, the elongate article may include at least one central strand around which the aforementioned outer strands are wound.

The central strand may comprise a core strand around which the aforementioned outer strands are wound, or an inner layer comprising a plurality of inner strands around which the aforementioned outer strands are wound. The inner strands may be wound around a core strand.

Each clamping member may comprise a preliminary engaging projection to initially engage the elongate article. The preliminary engaging projection may comprise a tooth on the engaging surface.

Each clamping member may comprise a plurality of the aforesaid preliminary engaging projections, such as three preliminary engaging projections. Each preliminary engaging projection may comprise a respective tooth.

The engaging surface may have a plurality of gripping formations. The gripping formations may comprise serrations, wherein each serration extends across the engaging surface.

The clamping members may be directly opposite each other. The elongate article may be disposed directly between the clamping members.

Each clamping member may be elongate, having a length and comprising front and rear regions, the front region leading the rear region when the clamping member is urged into engagement with the elongate article, and the front region being thinner than the rear region.

Each clamping member may be in the form of a wedge. The engaging surface of each clamping member may have an engaging length which is between approximately three fifths and approximately three quarters of the length of the clamping member.

The first and second clamping members may be arranged on the carriage diametrically opposite each other.

The securing device may comprise a resilient urging portion. The urging portion may be arranged to urge the carriage to the clamping condition. The urging portion may extend from the carriage. Alternatively, if desired, the resilient urging portion may be separate from the carriage.

The securing device may comprise a release portion. The release portion may be arranged to move the carriage to the release condition. The release portion may extend from the carriage.

The carriage and the resilient urging portion may together constitute a holding arrangement. The holding arrangement may further include the release portion. The holding arrangement may be deformable between an extended position and a retracted position. The holding arrangement may be formed of a plastics material and may be formed by moulding, for example injection moulding.

The resilient urging portion may be arranged to urge the holding arrangement to the extended position. The resilient urging portion may be integral with the carriage. The release portion may be arranged to move the holding arrangement to the retracted position. The release portion may be integral with the carriage.

The carriage and the urging portion may together constitute a unitary component. The carriage, the release portion and the urging portion may together constitute a unitary component. The carriage, the release portion and the urging portion may be formed integrally with each other.

The clamping condition of the carriage may correspond to the extended position of the holding arrangement. The release condition of the carriage may correspond to the retracted position of the holding arrangement.

The carriage may include a platform on which the clamping members are disposed. The carriage may define first and second receiving formations to receive the respective first and second clamping members. The first and second receiving formations may be arranged opposite each other.

The carriage may define a conduit therethrough through which the elongate article can extend. The conduit may extend between the receiving formations The first and second receiving formations may be respective first and second recesses defined by the carriage. Each receiving formation may comprise opposite receiving members, which may be opposite inclined partitions.

Each receiving formation may comprise retaining formations to retain the first and second clamping members in the respective receiving formations. The retaining formations may be provided on the edges of the receiving members.

The retaining formations may comprise protrusions on at least one of the edges of each receiving member. The retaining formations may comprise protrusions on both edges of each receiving formation.

Each clamping member may comprise corresponding formations to cooperate with the retaining formations. The retaining formations and the corresponding formations may comprise cooperable protrusions and indentations. In one embodiment, the retaining formations may comprise protrusions. In this embodiment, the corresponding formations may comprise indentations.

The carriage may include strengthening formations, which may extend from the receiving formations. The strengthening formations may be provided between the receiving formations. The strengthening formations may comprise strengthening ribs. Each of the strengthening formations may extend the length of the receiving formations.

The urging portion may comprise a coil spring. Alternatively, the urging portion may be in the form of another suitable type of spring, such as a wave spring or a leaf spring. The urging portion may further include an engaging portion. The urging portion may comprise opposite ends, one of the ends being attached to the carriage, and the other end being attached to the engaging portion.

The release portion may be substantially cylindrical. In the embodiment described herein, the release portion allows the carriage to be pushed in the body from the clamping condition to the release condition. The release portion may comprise a projecting member which projects through the body. The release portion includes a fastening formation, which may be a threaded region of the release portion.

A locking member may be arranged on the release portion. The locking member may cooperate with the fastening formation to lock the carriage in the clamping condition. The locking member may include threads to cooperate with the threaded region of the release portion.

The locking member may be movable along the release portion between an unlocked position and a locked position. The locking member may be movable along the release portion by being screwed along the release portion.

When the locking member is in the unlocked position, the carriage may be moved to the release condition. When the locking member is in the locked position, the carriage may be locked in the clamping condition. Thus, in the embodiments described herein, the movement of the locking member to the unlocked position provides the advantage that the locking member acts as a release button, which can be pressed towards the body to move the carriage to the release condition.

The locking member may define an aperture, through which the elongate article can extend. The locking member may define a side slot extending from the aperture to a side region of the locking member.

If desired, the elongate article may be passed through the slot to allow the locking member to be mounted on the release portion after the securing device is arranged on the elongate article.

The elongate article may be passed through the slot to allow the locking member to be received through the aperture thereby allowing the locking member to be mounted on the release portion when the securing device is arranged on the elongate article.

The securing device may include an indicator to indicate when the carriage is in the clamping condition. The indicator may comprise an upper indication region of the release portion.

When the locking member is screwed to the locked position, continued screwing of the locking member may move the carriage towards the locking member. The indicator may indicate that the carriage is in the clamping condition when the upper region is flush with, or extends from, the locking member.

The passage may have a main axis extending therethrough. The passage may have opposed guide walls to urge the clamping members to their clamping conditions in clamping engagement with the elongate article, when the carriage is moved to the clamping condition. Each of the guide walls may taper inwardly towards the axis.

The securing device may further include a reaction member to provide a reaction force to the urging portion. The reaction member may include attaching formations to attach the reaction member to the body.

The body may include further formations to cooperate with the attaching formations. The attaching formations and the further formations may comprise threads.

The reaction member may define a bore through which the elongate article can extend. The reaction member can be removed from the body to allow the carriage arrangement to be inserted therein.

The urging portion may include an engaging member for engaging the reaction member. The engaging member may comprise a radially outwardly extending member, which may be annular. The engaging member may include locating formations to interact with corresponding formations on the body to orient the carriage in a desired position in the body.

The body may include a radially outwardly extending flange portion to engage a support with which the securing device is to be used. The body may define an opening providing communication between the passage and a region external of the body. The body may further include a neck portion, which may extend between the flange portion and the opening.

In use, the neck portion may be received by an aperture in the support. The support may engage the flange portion when the neck portion is received by the aperture. The support may engage the flange portion.

In a further embodiment, the securing device may comprise a shoulder. The body may have a flange portion. The neck portion may be provided between the flange portion and the shoulder. The flange portion may extend in opposite directions from the neck portion. The flange portion may be oval shaped.

The flange portion may be of a suitable shape and size to fit through one of the apertures in the main member of the support. The support may be received between the flange portion and the shoulder.

The securing device may include an insertion member. The insertion member may be inserted between the securing device and the support. Desirably, the insertion member can be inserted between the flange portion and the support. The insertion member so inserted may push the shoulder into engagement with the support.

The insertion member may comprise a domed portion, which may be circular portion. The provision of the domed portion in the embodiment described herein provides the advantage that it allows the insertion member to accommodate different thicknesses of the support.

The insertion member may define an elongate slot. The slot may have a widened central region to hold the neck portion. The slot may have an opening through which the neck portion can be received into the widened central region. A wall formation is provided on the circular portion opposite the opening.

The insertion member may be a snap fit onto the neck portion. When the projecting portion is received through the aperture, the insertion member may be pushed onto the neck portion by the user applying a force on the wall formation until the neck portion is received in the widened central region. The wall formation provides the advantage in this embodiment that it spreads the force applied to the insertion member, thereby making it easier for the user to fit the insertion member on the neck portion.

In the second embodiment, the release portion may be formed as a plurality of, for example four, resiliently deformable threaded segments to receive a locking member thereon. The resiliently deformable segments may allow the locking member to be a push fit thereon The locking member may have an elongate configuration to allow the locking member to be received through the aperture in the support. The locking member may have an oval shape.

Each of the partitions of the carriage may define a pair of recessed regions extending inwardly from the outer edge. Each retaining formation may comprise a finger, which may extend from a respective one of the recessed regions. Each finger may be provided at its outer end with a hook portion to be received by the indentations defined by clamping members, and thereby retain the clamping members in the respective receiving formation.

Embodiments of the invention will now be described by way of example only with reference to the accompanying drawings, in which.

Figure 1:
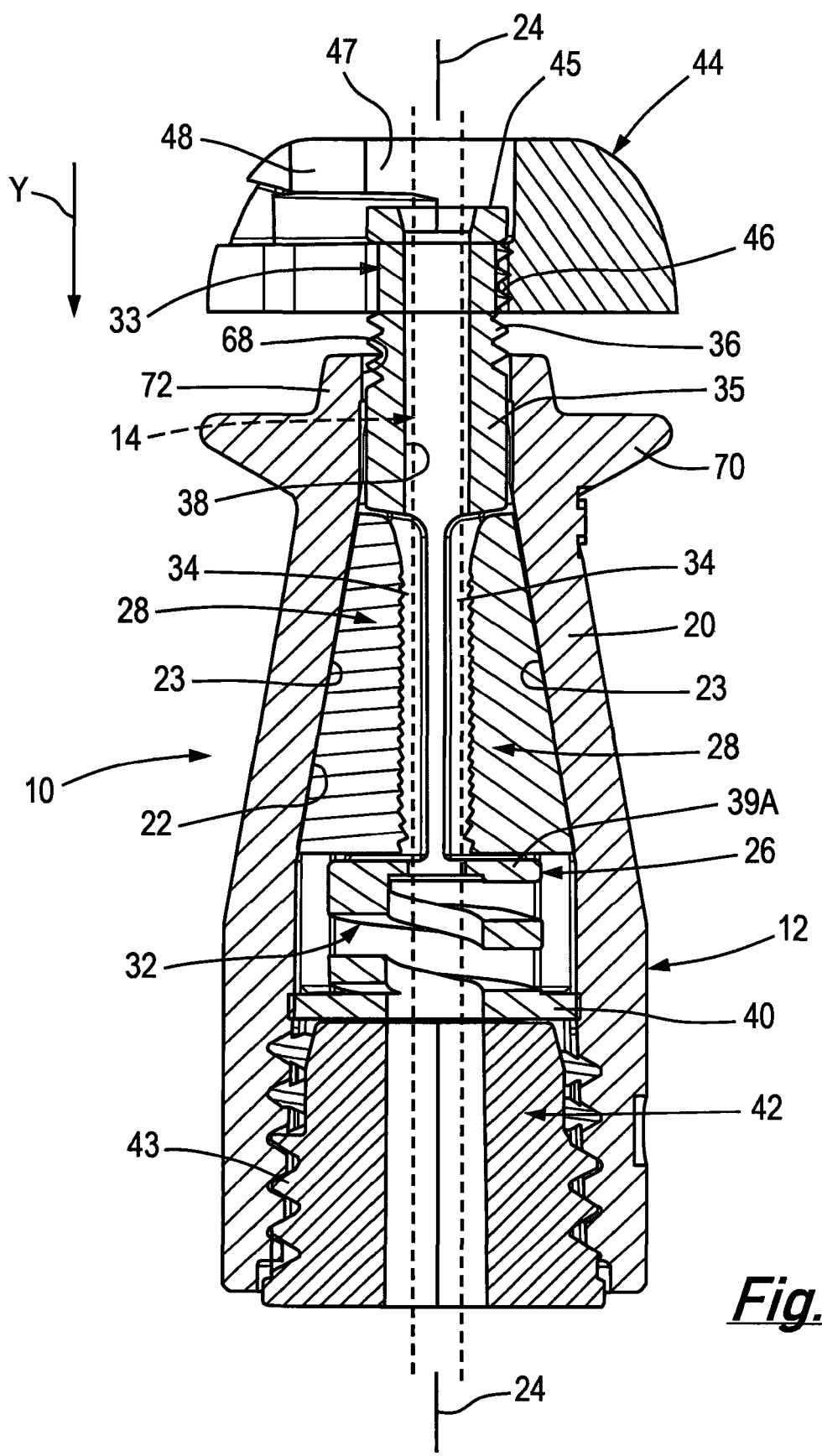
FIG. 1 is a sectional side view of a securing device showing a locking member in an unlocked position and a carriage in a released condition.
Figure 2:
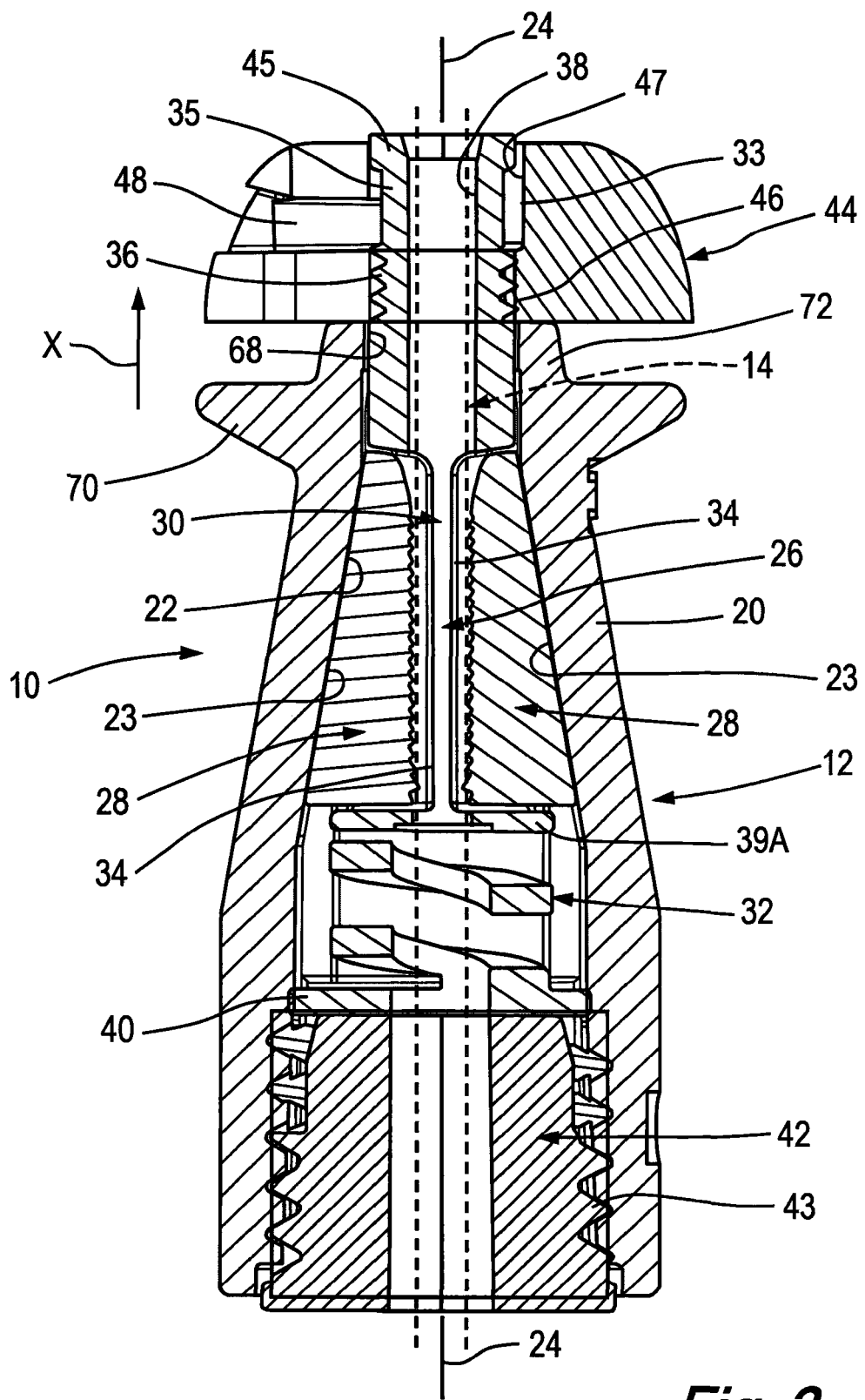
FIG. 2 is a sectional side view of the securing device showing the locking member in a locked position and the carriage in a clamping condition.
Figure 3:
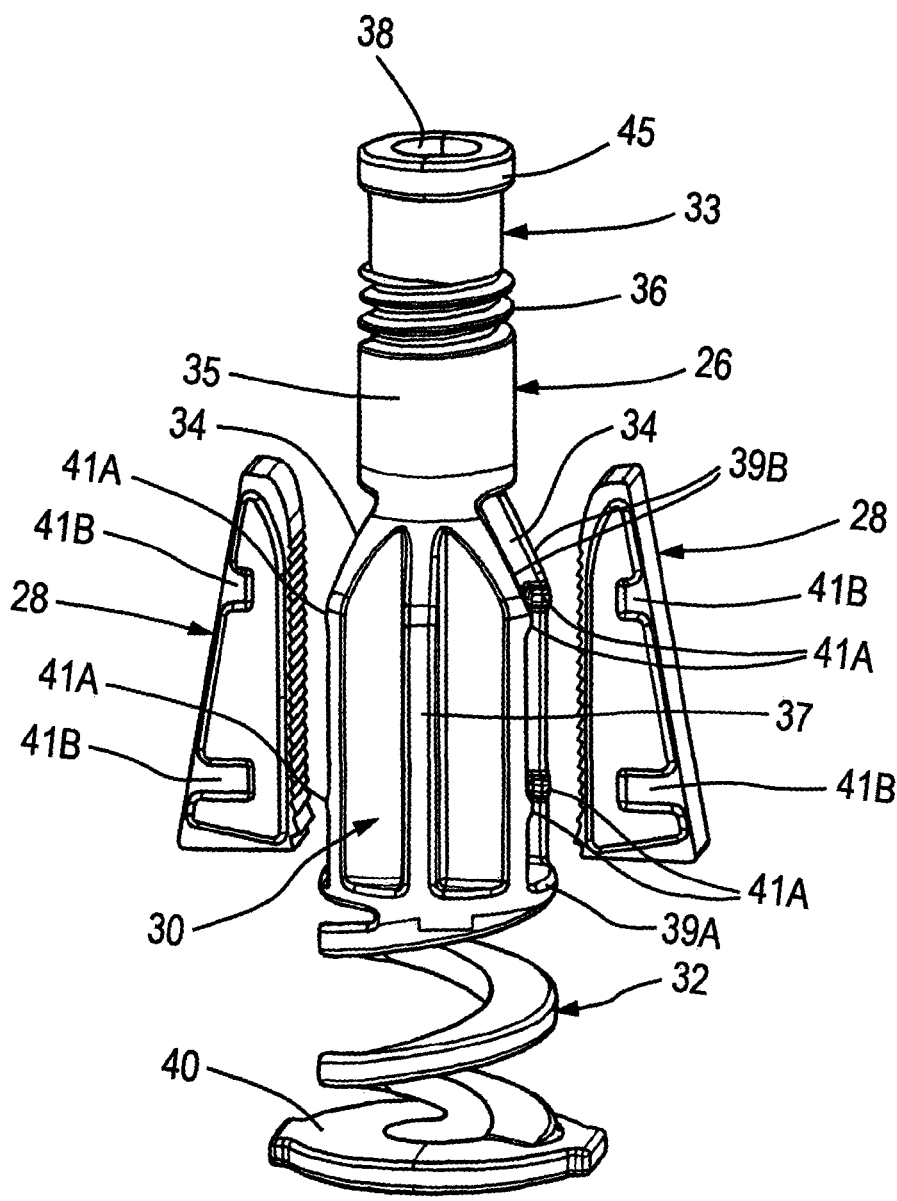
FIG. 3 shows a carriage and clamping members prior to installation of the clamping members in the carriage
Figure 4:
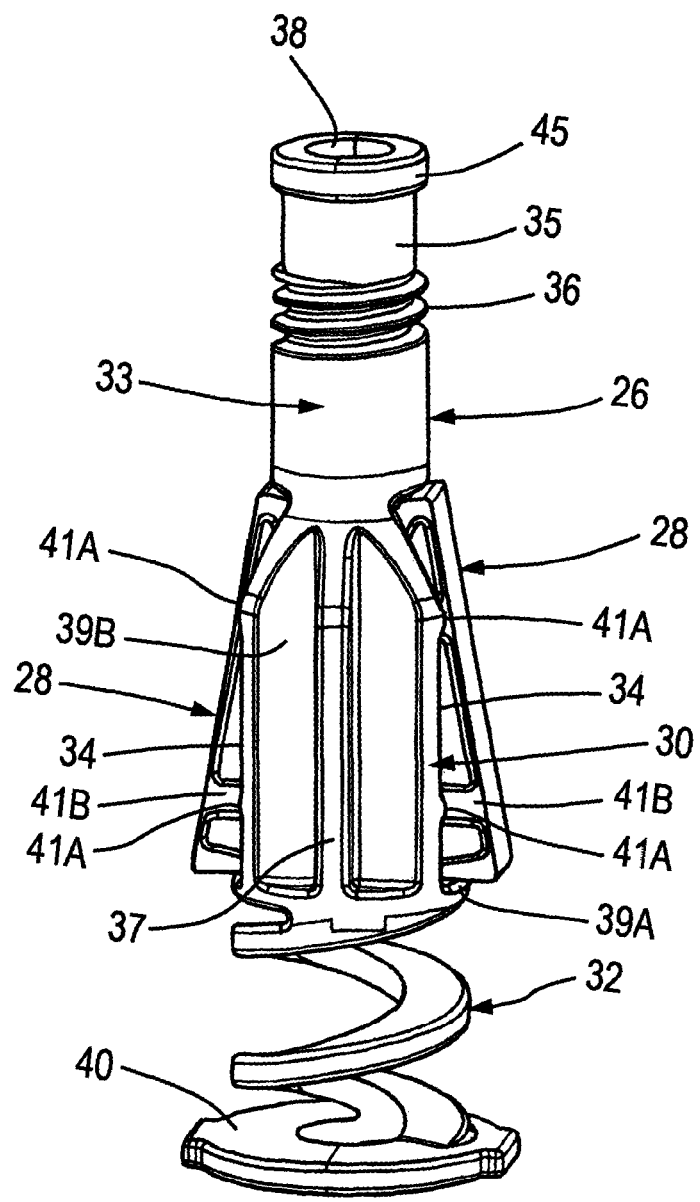
FIG. 4 shows the carriage and clamping members after installation of the clamping members in the carriage.

Referring to the FIGS. 1 to 8 of the drawings, a first embodiment of a securing arrangement 10. FIGS. 1 and 2 show the securing arrangement 10 comprising a first embodiment of a securing device 12 and an elongate article 14 in the form of a wire, cable, rope or the like. The elongate article 14 is shown in broken lines in FIGS. 1 and 2.

The elongate article 14 comprises an outer layer formed of a plurality of engageable strands in the form of outer strands 16A, 16B, 16C, 16D, 16E and 16F, and a core strand 18 around which the outer strands 16A to 16F are wound. The outer strands 16A to 16F and their interaction with the securing device 12 are shown more clearly in FIG. 5, and discussed below.

The securing device 12 comprises a body 20 defining a through passage 22 with opposed walls 23 that taper inwardly towards each other. In use, the elongate article 14 extends through the passage 22. The passage 22 has a longitudinal main axis 24 along which the elongate article 14 extends.

A holding arrangement 26 is provided within the passage 22. The securing device 12 further includes first and second clamping members 28 carried by the holding arrangement 26. Each clamping member 28 is in the form of a wedge. The holding arrangement 26 comprises a carriage 30 for holding first and second clamping members 28.

The holding arrangement 26 also includes a resilient urging portion 32 attached at one end of the carriage 30, and a release portion 33 attached at the opposite end of the carriage 30.

The carriage 30 defines first and second receiving formations 34 in the form of recesses for receiving and holding the first and second clamping members 28. Each of the clamping members 28 is received in a respective one of the receiving formations 34.

Strengthening formations 37 extend alongside the receiving formations 34. The strengthening formations 37 are disposed between the receiving formations 34.

The holding arrangement 26 defines an elongate conduit 38 which extends therethrough. The elongate conduit 38 extends through the carriage 30 alongside the receiving formations 34. The conduit 38 extends through the resilient urging portion 32, the carriage 30 and the release portion 33. The elongate article 14 can be received through the conduit 38 so that the elongate article 14 extends between the receiving formations 34.

The carriage 30, the resilient urging portion 32 and the release portion 33 are integrally formed as a unitary component, for example by moulding. In the embodiment described herein, the holding arrangement 26 is formed of a suitable plastics material.

The receiving formations 34 communicate with the conduit 38 to allow the clamping members 28 to engage the elongate article 14 in the conduit 38. The receiving formations 34 are arranged opposite each other so that the first and second clamping members 28 are disposed in an opposed relationship to each other. The clamping members 28 can therefore engage the elongate article 14 at diametrically opposite regions of the elongate article 14.

Each receiving formation 34 comprises a platform 39A and opposite receiving members in the form of partitions 39B inclined towards each other. The partitions 39B extend from the platform 39A. Four retaining formations in the form of protrusions 41A are provided on the outer edges of the opposite partitions 39B of each receiving formation 34. Corresponding formations, in the form of indentations 41B, are defined by clamping members 28. The protrusions 41A are received by the indentations 41B to retain the clamping members 28 in the receiving formations 34.

The holding arrangement 26 is disposed in the body 20 so that, when the carriage 30 is moved in the direction of the arrow X in FIG. 2, the tapering walls 23 urge the clamping members 28 towards each other and thereby into clamping engagement with the elongate article 14.

In use, the carriage 30 is movable along the passage 22 between a clamping condition, shown in FIG. 1 and a release condition. The movement of the carriage 30 along the passage 22 is effected by a deformation of the holding arrangement 26.

The deformation of the holding arrangement 26 occurs by the resilient urging portion 32 lengthening to extend the holding arrangement 26 from a retracted position to an extended position shown in FIG. 1. The carriage 30 is thus urged linearly along the passage 22 to the clamping condition by the resilient urging portion. Examples of the release condition of the carriage 30 and the retracted position of the holding arrangement 26 are discussed below in connection with the second embodiment.

As the carriage 30 moves along the passage 22 from the release condition to the camping condition shown in FIG. 1, the clamping members 28 are urged inwardly by the tapering walls 23 into clamping engagement with the elongate article 14.

The resilient urging portion 32 is in the form of a coil spring which extends from the carriage 30 to a free end. An engaging formation 40 is provided on the free end of the resilient urging portion 32. Alternatively, the urging portion 32 could be in the form of another suitable type of spring, such as a wave spring or a leaf spring.

The securing device 12 further includes a reaction member 42 to engage the engaging formation 40 on the resilient urging portion 32, thereby allowing the resilient urging portion 32 to urge the carriage 30 towards its extended position. The reaction member 42 has threads 43 so that it can be screwed into the passage 22 in the body 20. The reaction member 42 defines an axial bore therethrough aligned with the axis of the holding arrangement 26, and the elongate article 14 extends through the bore.

The release portion 33 is in the form of a cylindrical member 35 having a threaded region 36. As shown in FIGS. 1 and 2, the release portion 33 extends out of the body 20. A locking member 44, having corresponding threads 46, is fastened to the release portion 33 by screwing it thereon.

The locking member 44 defines a through aperture 47 through which the elongate article 14 extends when the locking member 44 is attached to the release portion 33. The locking member 44 also defines a slot 48 having an outer side opening 49 and an opposite inner side opening 50 to allow communication of the slot 48 with the through aperture 47.

When the elongate article 14 has been arranged to extend through the securing device 12, the locking member 44 can be mounted on the release portion 33 by sliding the elongate article 14 through the slot 48 to the aperture 47.

The elongate article 14 passes through the slot 48 as the locking member 44 moves over the body 20 until the release portion 33 is aligned with the aperture 47. The release portion 33 can then be received in the aperture 47 to allow the locking member 44 to be screwed onto the release portion 33.

The locking member 44 can be screwed along the release portion 33 from an unlocked position, shown in FIG. 1, to a locked position, shown in FIG. 2. When the carriage 30 is in the extended position, the locking member 44 can be screwed onto the release portion 33 to the locked position to lock the carriage 30 in the extended position, thereby locking the clamping members 28 in clamping engagement with the elongate article 14.

The carriage 30 has an indicator in the form of an upper indication region 45. When the locking member 44 is screwed along the release portion 33 to the locked position shown in FIG. 2, the carriage 30 moves in the direction indicated by the arrow X. Continued screwing of the locking member 44 causes the indication region 45 to project from the top of the locking member 44. When this happens, it provides an indication to the user that the carriage 30 is in the extended position and the clamping members are in full clamping engagement with the elongate article 14. The projection of the indication region 45 from the top of the locking member 44 also indicates that the locking member 44 is in the locked position.

Figure 5:
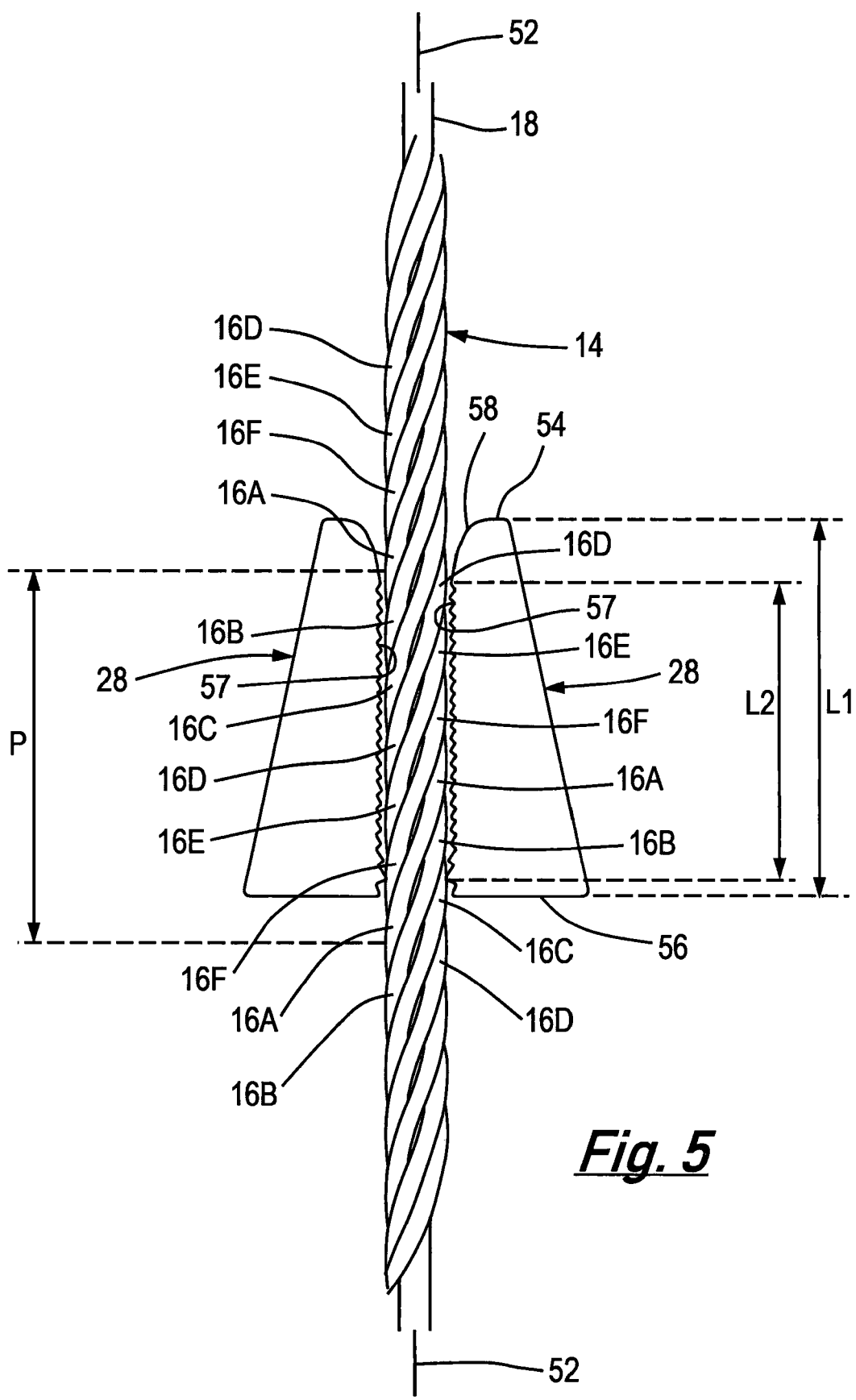
FIG. 5 is a schematic diagram showing the relationship between the clamping members and the elongate article.
Figure 6:
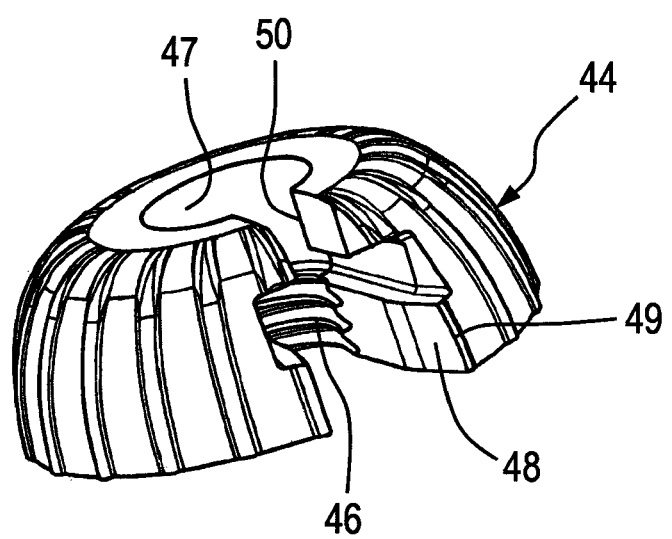
FIG. 6 shows a locking member.

The outer strands 16A to 16F of the elongate article 14 are helically wound around one another in a plurality of turns of each outer strand 16A to 16F. Each of the outer strands 16A to 16F has a pitch P. The elongate article 14 has a longitudinal main axis 52. The pitch P is the distance along the main axis 52 of the elongate article 14 of one complete turn of one of the outer strands 16A to 16F. In FIG. 5, the pitch of the outer strand 16A is shown, but it will be appreciated that the pitch of each other outer strand 16B to 16F is the same.

Each clamping member 28 has a length L1 extending from a front region 54 to a rear region 56. Each clamping member 28 also has an engaging surface 57 with a length L2. The length L2 is between approximately three fifths and approximately three quarters of the length L1 of the respective clamping member 28.

The front region 54 of each clamping member 28 has a curved leading surface 58, which curves convexly from the front end region 54 to the engaging surface 57. The curved leading surface 58 facilitates movement of the respective clamping member 28 along the passage 22 in engagement with the elongate article 14. The curved leading surface 58 also has the effect of reducing the stress in the elongate article 14 gradually which helps to prevent fracture of the elongate article 14.

The whole length L2 of the engaging surface 57 engages each of the outer strands 16A to 16F. This means that, in use, when the clamping members 28 are used to clamp the elongate article 14, each of the outer strands 16A to 16F is engaged by both clamping members 28.

In use, the clamping members 28 are disposed within the receiving formations 34, and the holding arrangement 26 is installed within the body 20. The elongate article 14 is threaded into the carriage 30 in the direction of the arrow Y shown in FIG. 1. The clamping members 28 are engaged by the end of the elongate article 14 and moved out of the way to allow the elongate article 14 to be threaded through the holding arrangement 26.

A desired length of the elongate article 14 is threaded through the body 20 and the holding arrangement 26 between the clamping members 28. The elongate article 14 can then be pulled in the direction opposite to that indicated by the arrow Y, thereby pulling the carriage 30 the along the passage 22 between the inwardly tapering walls 23 towards the extended position.

The clamping members 28 engage the walls 23 and are urged towards each other by the tapering of the walls 23, thereby clamping the elongate article 14 therebetween. The carriage 30 can then be locked in the extended position by screwing the locking member 44 onto the release portion 33 to the locked position.

It may be desired to release the clamping members 28 from the elongate article 14, for example to adjust the position of the securing device 12 on the elongate article 14. In such a circumstance, the locking member 44 is unscrewed to its unlocked position.

The locking member 44 is then pressed by the user in the direction indicated by the arrow Y in FIG. 1 to push the carriage 30 from the extended position to the retracted position. This has the effect of moving the holding arrangement 26 to the release condition so that the clamping members 28 are released from the elongate article 14.

The securing device 12 can then be moved along the elongate article 14 to another position and the clamping members 28 re-clamped onto the elongate article 14. If desired, before pressing the locking member 4, the reaction member 42 can be removed, thereby removing any upward force on the carriage 30.

Figure 7:
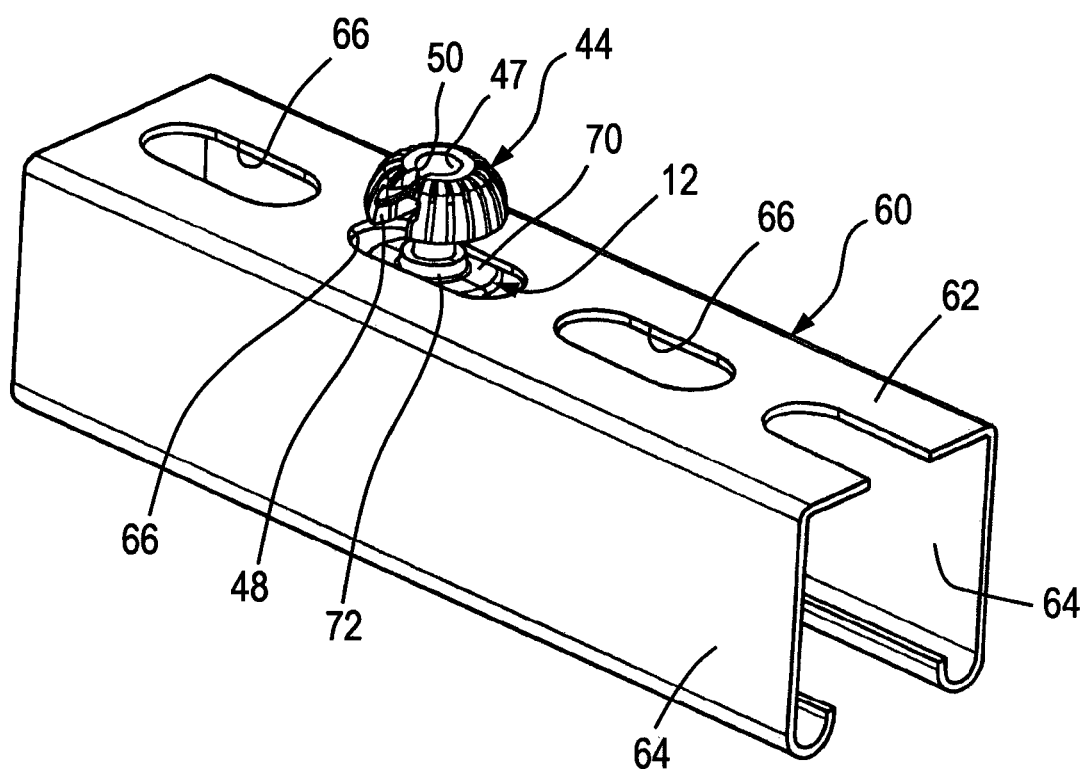
FIG. 7 is a perspective view of the securing device mounted on a support.
Figure 8:
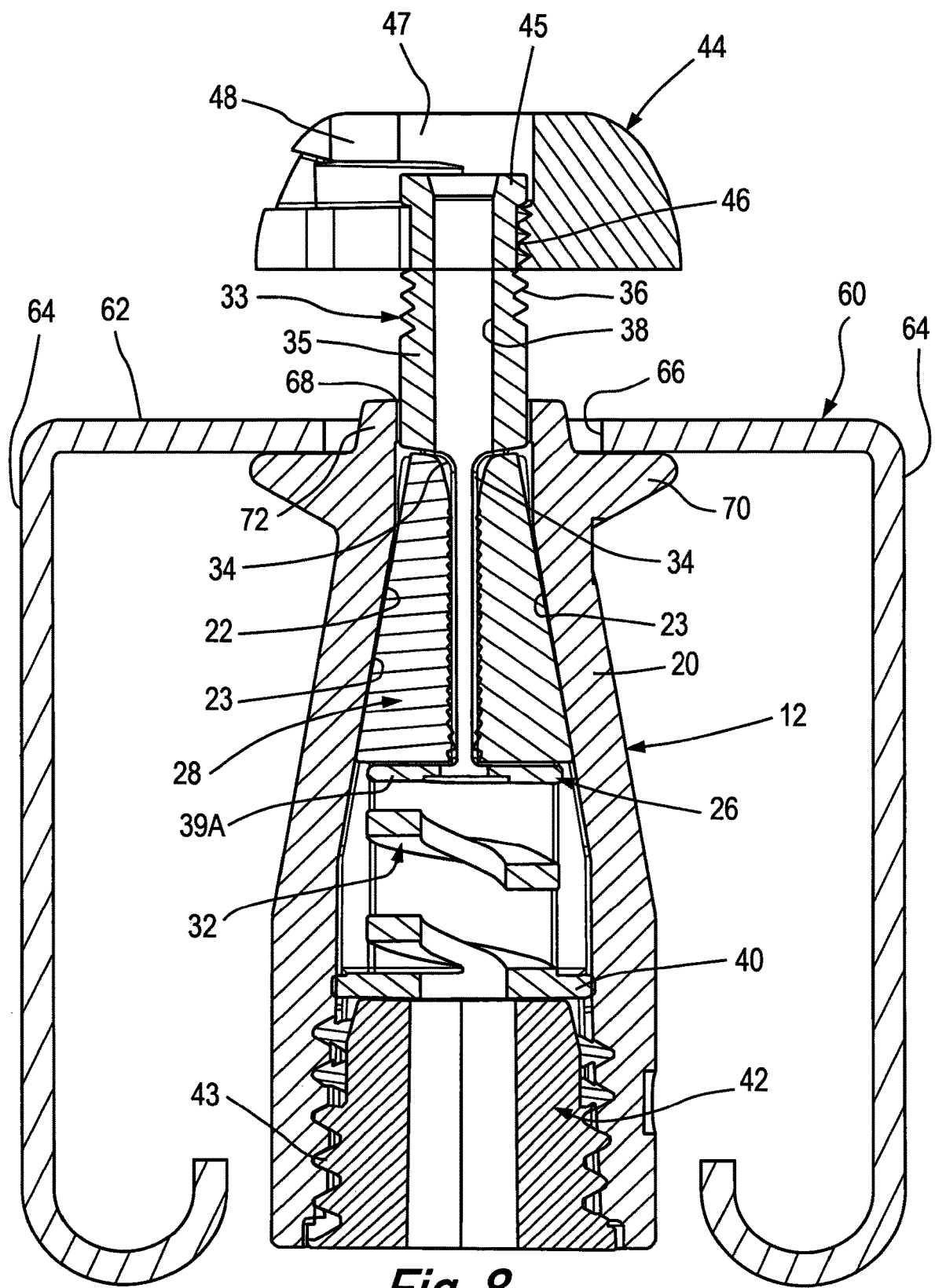
FIG. 8 is a sectional end view showing the securing device mounted on a support.

Referring to FIGS. 7 and 8, the securing device 12 is shown in use, having a support 60 mounted thereon. In FIGS. 7 and 8, the support 60 is in the form of a strut, but any other suitable support can be mounted on the securing device 12. The support 60 can be of any suitable length and can be suspended, for example, from a roof or ceiling by a plurality of securing arrangements 10. FIGS. 7 and 8 show only a portion of the support 60, and only one securing device 10.

The support 60 has an elongate substantially flat main member 62 and a pair of opposed elongate substantially flat side members 64 extend from opposite edges of the main member 62.

The main member 62 defines a plurality of apertures 66. In order to mount the support 60 on the securing device 12, the locking member 44 can be removed from the release portion 33. The release portion 33 of the holding arrangement 26 is inserted through one of the apertures 66 and, when so inserted, the locking member 44 is replaced on the release portion 33 in the unlocked position, as shown in FIGS. 7 and 8.

The body 20 defines an upper opening 68 to provide communication between the passage 22 and a region external to the body 20. The body 20 includes a radially outwardly extending flange portion 70 and a neck portion 72 of the body 20 between the flange portion 70 and the opening 68.

When the release portion 33 is received through the aperture 66, the main member 62 can engage the flange portion 70 to rest thereon. The locking member 44 can be replaced on the release portion 33 either before or after the elongate article 14 is inserted through the conduit 38. This has the effect of attaching the securing device 12 to the support 60 so that they are retained together until the user is ready to attach the securing device 12 to the elongate article 14.

When the user is ready to secure the elongate article 14 to the securing device 12, the elongate article 14 can be inserted into the conduit 38 defined by the holding arrangement 36 via the opening 68. The user maintains the locking member 44 in its unlocked position, so that the securing device 12, with the support 60 mounted thereon, can be moved along the elongate article 14 to a desired position.

The user then pulls the elongate article 14 relative to the securing device 12 in the direction indicated by the arrow X (see FIG. 2) to pull the carriage 30 to the extended position. This causes the clamping members 28 to clamp the elongate article 14. The locking member 44 can then be screwed along the release portion 33 to the locked position, thereby locking the clamping members 28 in clamping engagement with the elongate article 14.

The support 60 remains on the securing device 10, resting on the flange portion 70. In this position of the support 60, the neck portion 72 extends through the aperture 66 in the support 60. When the locking member 44 is in the locked position, it does not engage the support 60 and, thereby, allows relative movement between the securing device 12 and the support 60.

There is thus described a securing device 12 having first and second opposed clamping members 28 held by a holding arrangement 26. The holding arrangement 26 can be moved between a clamping condition and a release condition. The tapering walls 23 are arranged at an angle relative to each other that allows easier release of the clamping members 28 than prior art securing devices.

In addition, the provision of the holding arrangement 26 provides the advantage that it maintains the clamping members 28 in alignment opposite each other as they are pulled along the passage 22 by the friction between the elongate article 14 and the clamping members 28.

Various modifications can be made without departing from the scope of the invention. For example, the neck portion 72 may be configured, e.g. by reducing its length, so that the locking member 44 can engage the support 60 when the locking member 44 is in the locked position, thereby fastening the support 60 to the securing device 12.

FIGS. 9 to 14 show a second embodiment of the securing device, generally designated 112 which comprises many of the same features of the first embodiment of the securing device 12 shown in FIGS. 1 to 8. These features operate in the same way, and are designated in FIGS. 9 to 14 with the same reference numerals, as the corresponding features shown in FIGS. 1 to 8.

The securing device 112 differs from the securing device 12 in that the body 20 provides a circumferentially extending shoulder 114 below the neck portion 72. The body 20 also has an oval shaped flange portion 116, which is provided above the neck portion 72. The flange portion 116 extends in opposite directions from the neck portion 72.

Thus, a circumferentially extending recess 118 is defined between the shoulder 114 and the flange portion 116 around the neck portion 72.

Figure 13:
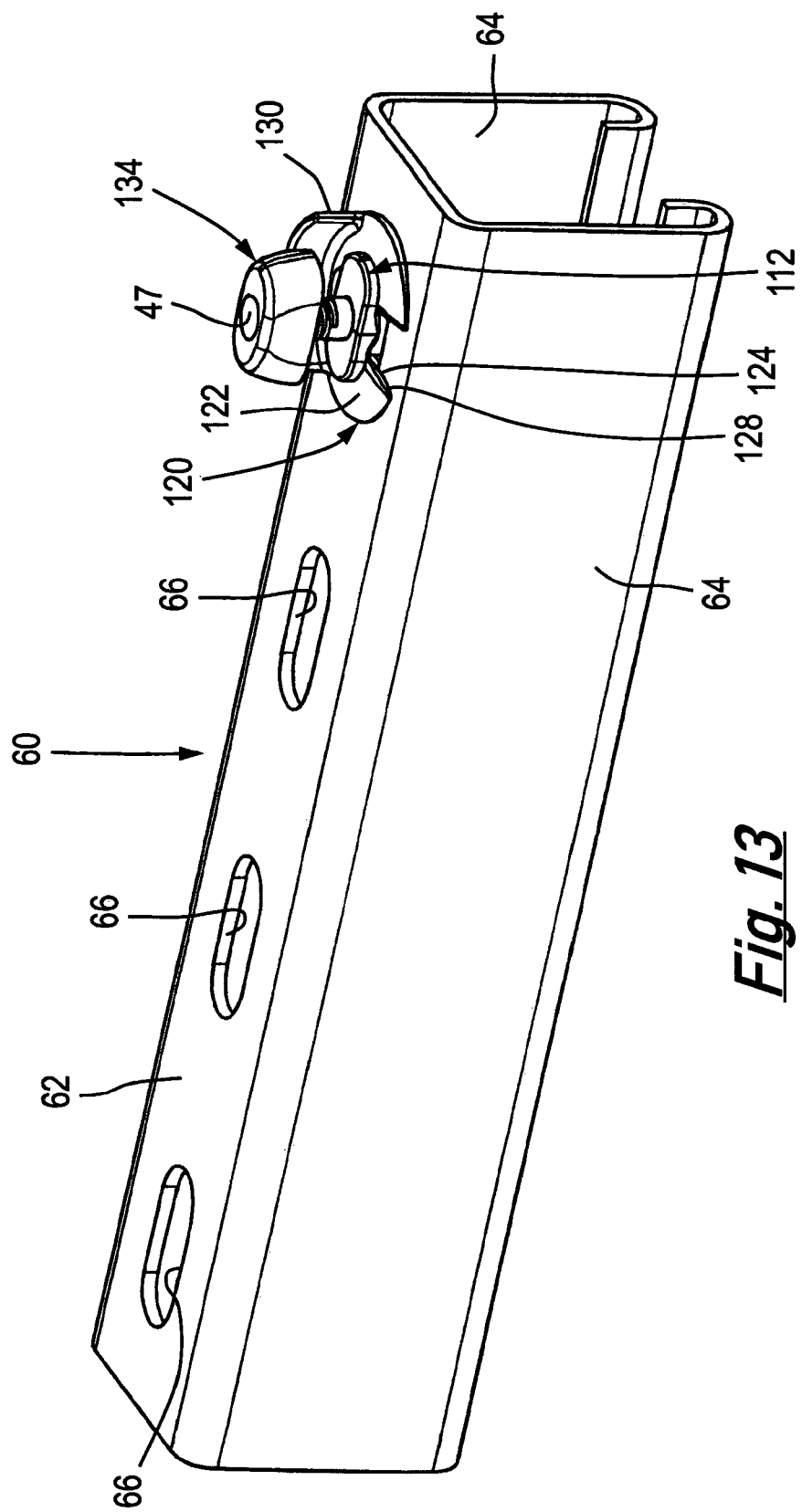
FIG. 13 is a perspective view of the securing device mounted on a support.
Figure 14:
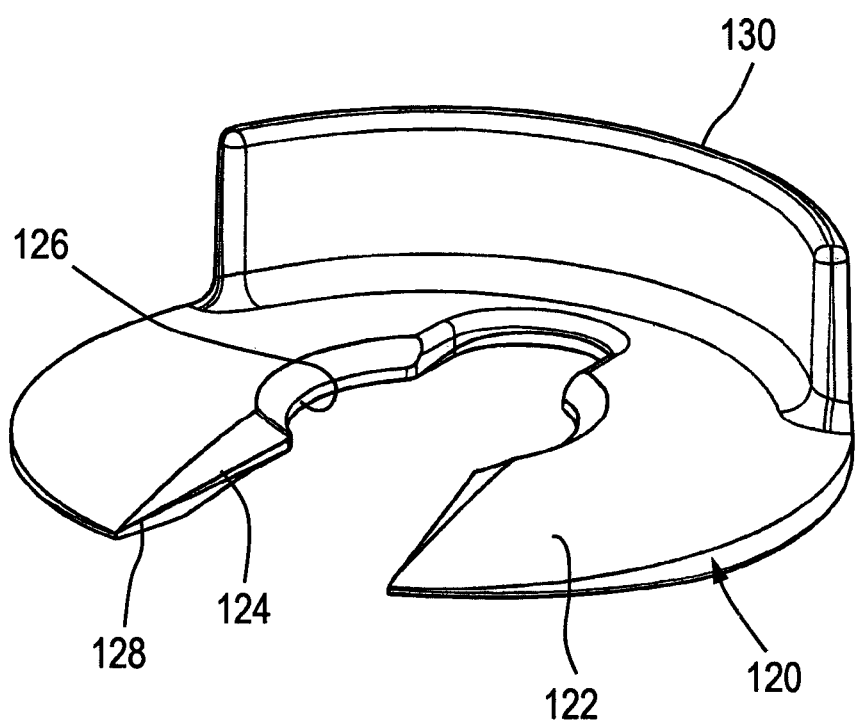
FIG. 14 shows an insertion member.

The flange portion 116 is of a suitable shape and size to fit through one of the apertures 66 in the main member 62 of the support 60, as shown in FIG. 13. In order to securely mount the securing device 112 on the support 60, an insertion member 120 is provided.

The insertion member 120 comprises a circular portion 122, which is domed to accommodate different thicknesses of the main member 62 of the support 60. The circular portion 122 defines an elongate slot 124 having a widened central region 126 to hold the neck portion 72. The slot 124 has an opening 128 through which the neck portion 72 can be received into the widened central region 126. A wall formation 130 is provided on the circular portion 122 opposite the opening 128.

The insertion member 120 is a snap fit onto the neck portion 72. When the flange portion 116 is received through the aperture 66, the insertion member 120 can be pushed, e.g. with the user's thumb, onto the neck portion 72 by the user applying a force on the wall formation 130 until the neck portion 72 is received in the widened central region 126.

The insertion member 120 is received on the neck portion 72 between the flange portion 116 and the main member 62, and thereby pushes the shoulder 114 into engagement with the main member 62.

The wall formation 130 spreads the force applied to the insertion member 120, thereby making it easier for the user to fit the insertion member 120 on the neck portion 72.

The release portion 33 is formed as four resiliently deformable segments 132 to receive a locking member 134 thereon. The segments 132 include the threads 36. The resiliently deformable segments 132 allow the locking member 134 to be a push fit thereon.

The locking member 134 defines the through aperture 47 which includes the threads 46. When so fitted thereon, the locking member 134 can then be screwed along the threads 36 of the release portion 33 between the locked and unlocked position in the same way as described above for the locking member 44.

The locking member 134 for use in the securing device 112 is similar to the locking member 44 described above, but has an oval shape, as shown in FIG. 13.

The locking member 134 does not possess the slot of the locking member 44 described above, because the oval shape of the locking member 134 allows it to pass through the aperture 66 in the support 60, and therefore does not have to be removed from the body 20 to mount the securing device 112 on the support 60. By not having to remove the locking member 134 to mount the securing device 112 on the support 60, there is less risk that the locking member 134 will be lost.

Each of the partitions 39B of the carriage 30 define a pair of recessed regions 136 extending inwardly from the outer edge of each partition 39B. A retaining formation in the form of a finger 138 extends from the recessed region 136. Each finger 138 is provided at its outer end with a hook portion 140 to be received by the indentations 41B defined by clamping members 28, and thereby retain the clamping members in the respective receiving formation 34.

Figure 9:
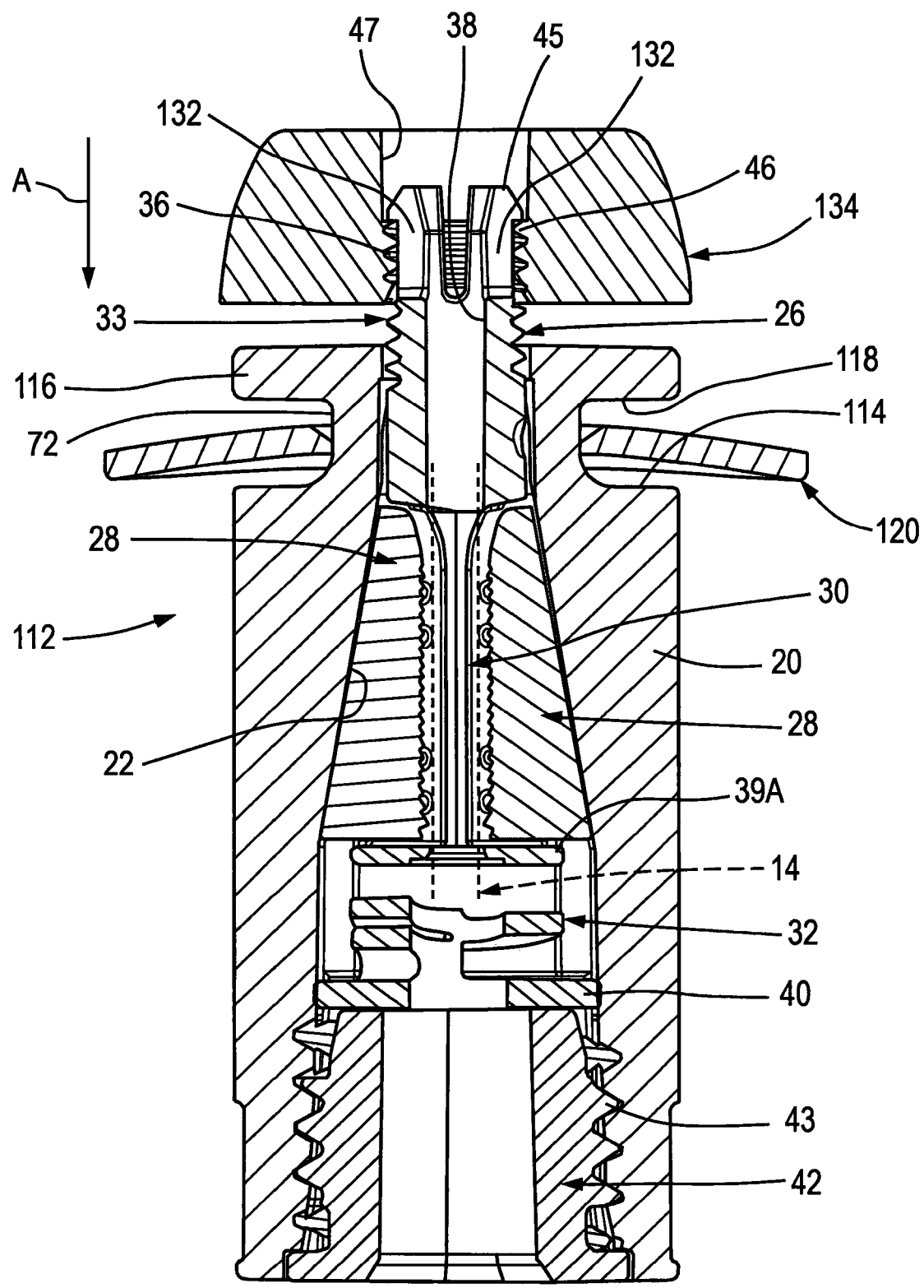
FIG. 9 is a sectional side view of a second embodiment of the securing device showing a locking member in an unlocked position and a carriage in a released condition.
Figure 10:
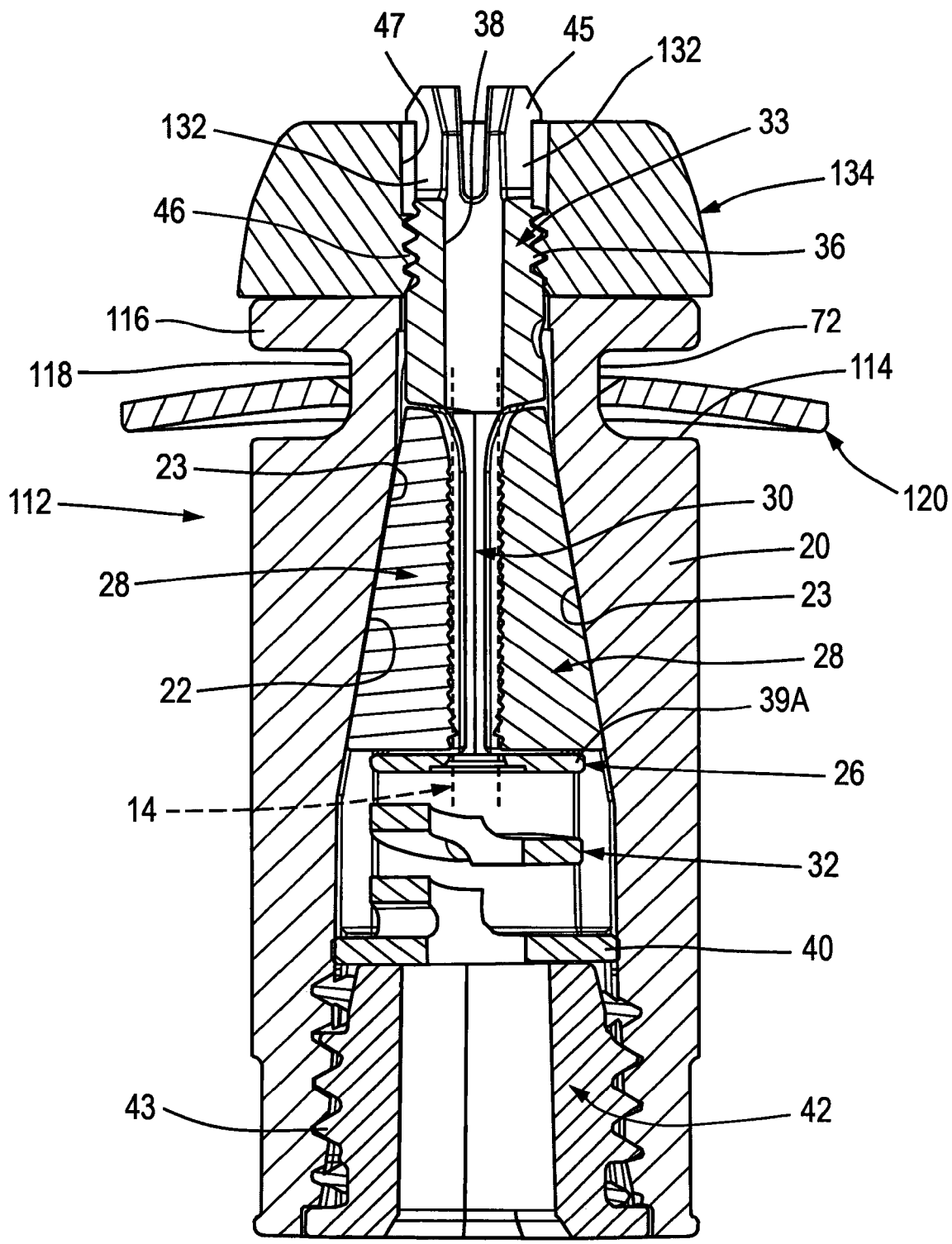
FIG. 10 is a sectional side view of the further securing device showing the locking member in a locked position and the carriage in a clamping condition.
Figure 11:
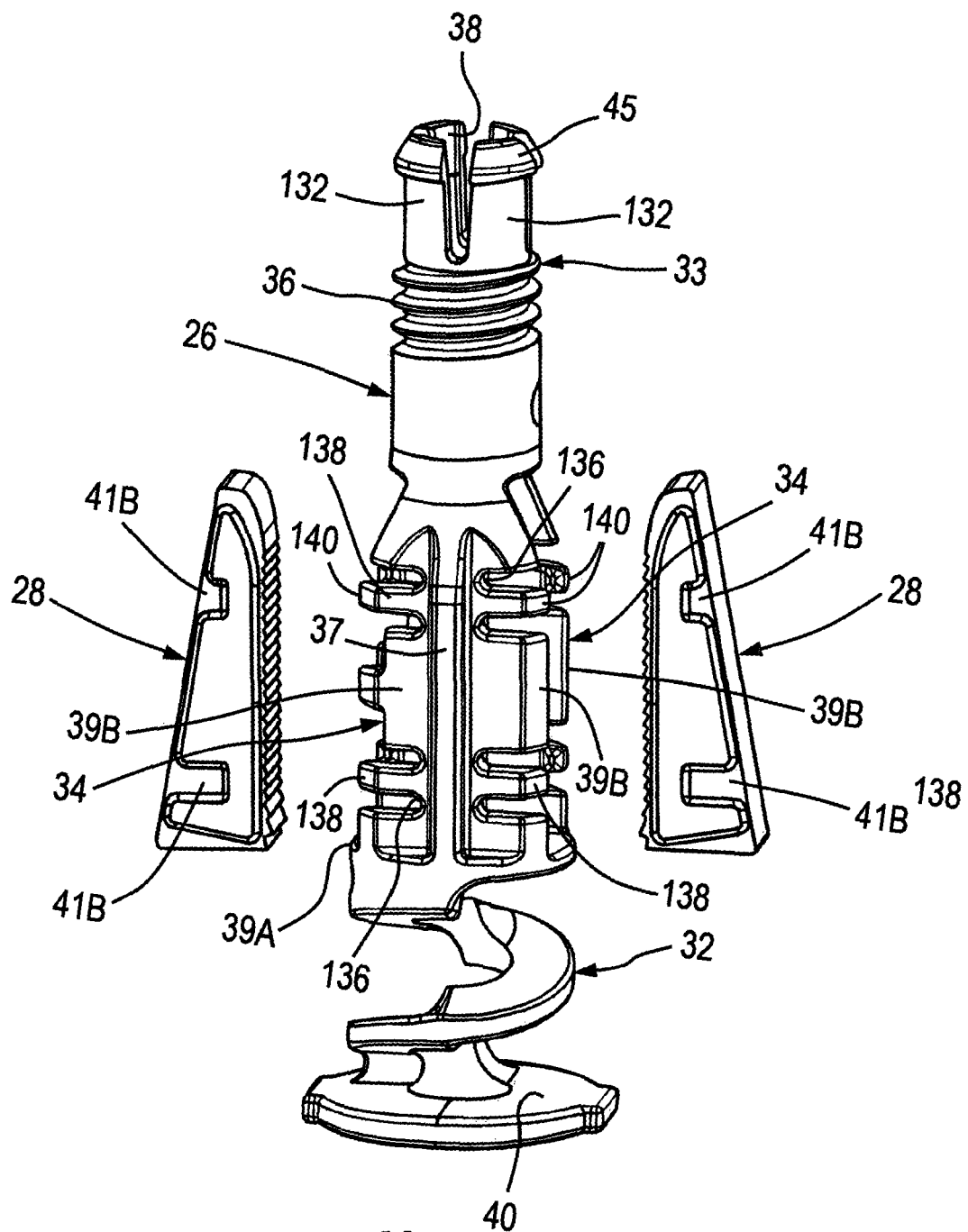
FIG. 11 shows a further carriage and clamping members prior to installation of the clamping members in the carriage
Figure 12:
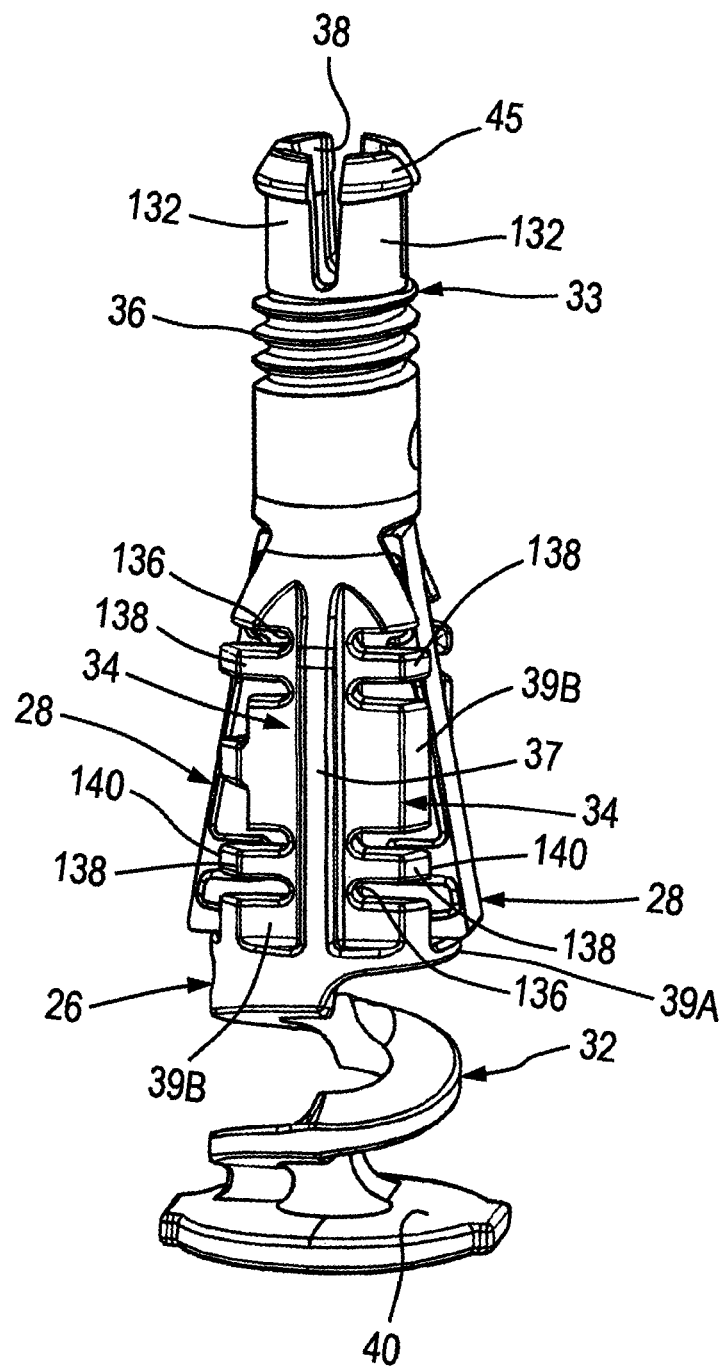
FIG. 12 shows the further carriage and clamping members after installation of the clamping members in the carriage.

FIG. 9 is a cross sectional view of the securing device 112, showing the carriage 30 in the release condition and the locking member 134 in the unlocked position. FIG. 10 is a cross sectional of the securing device 112, showing the carriage 30 in its clamping condition and the locking member 134 in the locked position.

In FIG. 10, the clamping members 28 are clamped against the elongate article 14, a portion of which is shown in broken lines in FIG. 10. Also in FIG. 10, the locking member 134 has been screwed onto the flange portion 116, thereby preventing the carriage 30 from being moved to the release condition.

In FIG. 9, the locking member 134 is disengaged from the flange portion 116 and moved to the unlocked position. The clamping members 28 are released from the elongate article 14, a portion of which is also shown in FIG. 9, by pressing on the release member 134 in the direction indicated by the arrow A, thereby allowing the securing device 112 to move along the elongate article 14.

The invention claimed is:

1. A securing device comprising:

first and second elongate clamping members, each clamping member having an engaging surface for engaging an elongate article;

a carriage for carrying the clamping members, wherein the carriage is movable between a clamping condition, in which the clamping members can clamp the elongate article, and a release condition, in which the clamping members are released from the elongate article; and a body having first and second walls tapering inwardly towards each other, the first and second walls defining a passage along which the carriage can move, said passage being configured to receive the elongate article therethrough between the clamping members;

wherein movement of the carriage along the passage in the direction of the inward tapering of the walls causes the clamping members to be urged towards each other so that the engaging surfaces can engage the elongate article to clamp the elongate article therebetween;

wherein the carriage defines first and second receiving formations to receive the respective first and second clamping members, and each receiving formation comprises retaining formations to retain the first and second clamping members in the respective receiving formations, and each clamping member comprises corresponding formations to cooperate with the retaining formations.

2. A securing device according to claim 1, wherein the securing device comprises a resilient urging portion arranged to urge the carriage to the clamping condition, the resilient urging portion extending from the carriage.

3. A securing device according to claim 2, wherein the resilient urging portion is integral with the carriage.

4. A securing device according to claim 1, wherein the securing device comprises a release portion arranged to move the carriage to the release condition the release portion extending from the carriage.

5. A securing device according to claim 4, wherein the release portion comprises a projecting member which projects through the body.

6. A securing device according to claim 4, wherein the release portion includes a fastening formation, and the securing device includes a locking member arranged on the release portion, the locking member cooperating with the fastening formation to lock the carriage in the clamping condition, the locking member being movable along the release portion between an unlocked position and a locked position.

7. A securing device according to claim 6, wherein the release portion is formed as a plurality of resiliently deformable threaded segments to receive the locking member thereon, the resiliently deformable segments being configured to allow the locking member to be a push fit thereon and the locking member has an elongate configuration to allow the locking member to be received through the aperture in the support.

8. A securing device according to claim 1, wherein the carriage includes a platform on which the clamping members are disposed.

9. A securing device according to claim 8, wherein the carriage defines a conduit therethrough through which the elongate article can extend, the conduit extending between the receiving formations.

10. A securing device according to claim 1, wherein the first and second clamping members are arranged diametrically opposite each other.

11. A securing device according to claim 1, wherein each clamping member is elongate, having a length and comprising front and rear regions, the front region leading the rear region when the clamping member is urged into engagement with the elongate article, and the front region being thinner than the rear region.

12. A securing device according to claim 1, wherein the engaging surface of each clamping member has an engaging length which is between approximately three fifths and approximately three quarters of the length of the clamping member.

13. A securing device according to claim 1, wherein the securing device comprises a shoulder, and wherein the body has a flange portion and a neck portion between the flange portion and the shoulder, the flange portion extending in opposite directions from the neck portion and the securing device includes an insertion member which can be inserted between the securing device and the support, thereby pushing the shoulder into engagement with the support.

14. A securing device according to claim 13, wherein the insertion member comprises a domed portion and the insertion member defines an elongate slot, the slot having a widened central region to hold the neck portion.

15. A securing device according to claim 14, wherein the slot has an opening through which the neck portion can be received into the widened central region, and the insertion member further includes a wall formation on the domed portion opposite the opening.

16. A securing device according to claim 15, wherein the insertion member is a snap fit onto the neck portion, whereby when the projecting portion is received through the aperture, the insertion member can be pushed onto the neck portion by the user applying a force on the wall formation until the neck portion is received in the widened central region.

17. A securing arrangement comprising;
a securing device comprising:
first and second elongate clamping members, each clamping member having an engaging surface for engaging an elongate article;
a carriage for carrying the clamping members, wherein the carriage is movable between a clamping condition, in which the clamping members can clamp the elongate article, and a release condition, in which the clamping members are released from the elongate article; and
a body having first and second walls tapering inwardly towards each other, the first and second walls defining a passage along which the carriage can move, said passage being configured to receive the elongate article therethrough between the clamping members;
wherein movement of the carriage along the passage in the direction of the inward tapering of the walls causes the clamping members to be urged towards each other so that the engaging surfaces can engage the elongate article to clamp the elongate article therebetween; and
the securing arrangement further comprises an elongate article comprising a plurality of engageable strands wound around one another in a plurality of turns of each strand, wherein each strand has substantially the same pitch as each other strand;
wherein each clamping member is configured to engage: at least two thirds of the total number of said engageable strands.

18. A securing arrangement according to claim 17, wherein each clamping member is configured to engage: at least three quarters of the total number of said engageable strands; or all of said engageable strands.

19. A securing arrangement comprising:
a securing device comprising:
first and second elongate clamping members, each clamping member having an engaging surface for engaging an elongate article;
a carriage for carrying the clamping members, wherein the carriage is movable between a clamping condition, in which the clamping members can clamp the elongate article, and a release condition, in which the clamping members are released from the elongate article; and
a body having first and second walls tapering inwardly towards each other, the first and second walls defining a passage along which the carriage can move, said passage being configured to receive the elongate article therethrough between the clamping members;
wherein movement of the carriage along the passage in the direction of the inward tapering of the walls causes the clamping members to be urged towards each other so that the engaging surfaces can engage the elongate article to clamp the elongate article therebetween; and
the securing arrangement further comprises an elongate article comprising a plurality of engageable strands wound around one another in a plurality of turns of each strand, wherein each strand has substantially the same pitch as each other strand;
wherein each engaging surface has a dimension which is substantially equal to: at least 50% of the pitch of said engageable strands.

20. A securing arrangement according to claim 19, wherein the engaging surface is configured to engage the elongate article, such that the aforesaid dimension of the engaging surface extends along the elongate article.

21. A securing arrangement according to claim 19, wherein the engaging surface of each clamping member has an engaging length which is between approximately three fifths and approximately three quarters of the length of the clamping member.

22. A securing arrangement according to claim 19, wherein each engaging surface has a dimension which is substantially equal to at least 67% of the pitch of said engageable strands; at least 75% of the pitch of said engageable strands; or at least 100% of the pitch of said engageable strands.

* * * * *